(12) United States Patent
Gunnarsson et al.

(10) Patent No.: US 10,808,876 B2
(45) Date of Patent: Oct. 20, 2020

(54) LINING AN INTERNAL WALL OF A CONDUIT

(71) Applicant: Isealate AS, Stavanger (NO)

(72) Inventors: Bengt Gunnarsson, Hundvåg (NO); Einar Waage-Rasmussen, Hommersåk (NO); Dan Forsström, Norrtälje (SE); Johan Haasum, Stockholm (SE)

(73) Assignee: Isealate AS, Stavanger (NO)

( * ) Notice: Subject to any disclaimer, the term of this patent is extended or adjusted under 35 U.S.C. 154(b) by 155 days.

(21) Appl. No.: 16/078,691

(22) PCT Filed: Feb. 23, 2017

(86) PCT No.: PCT/NO2017/050051
§ 371 (c)(1),
(2) Date: Aug. 22, 2018

(87) PCT Pub. No.: WO2017/146593
PCT Pub. Date: Aug. 31, 2017

(65) Prior Publication Data
US 2019/0049054 A1     Feb. 14, 2019

(30) Foreign Application Priority Data

Feb. 24, 2016   (NO) .................................. 20160313

(51) Int. Cl.
*F16L 55/165*   (2006.01)
*F16L 55/163*   (2006.01)
(Continued)

(52) U.S. Cl.
CPC .......... *F16L 55/1653* (2013.01); *E21B 17/00* (2013.01); *E21B 43/103* (2013.01);
(Continued)

(58) Field of Classification Search
CPC . F16L 55/163; F16L 55/1653; F16L 55/1655; F16L 55/18; Y10T 29/49732
(Continued)

(56) References Cited

U.S. PATENT DOCUMENTS 4,197,880 A * 4/1980 Cordia .................... B29C 61/04
                                                       138/178
5,119,862 A    6/1992 Maimets et al.
(Continued)

FOREIGN PATENT DOCUMENTS

DE     19835316     2/2000
EP     0899420      3/1999
(Continued)

OTHER PUBLICATIONS

Norwegian Search Report, Norwegian Patent Application No. 20160313, dated Jul. 27, 2016.
(Continued)

*Primary Examiner* — Patrick F Brinson
(74) *Attorney, Agent, or Firm* — Andrus Intellectual Property Law, LLP (57) ABSTRACT

A method and apparatus for lining at least one part of a wall of a conduit. In particular embodiments, a piece of material in the form of a sheet may be provided with adhesive thereupon, the sheet being curled or rolled up to allow insertion into the conduit. The curled or rolled up sheet may then be positioned inside the conduit, and once positioned inside the conduit, may at least partially uncurl or unroll to apply the sheet to the wall via the adhesive to obtain a laminate.

26 Claims, 6 Drawing Sheets

(51) Int. Cl.
  *E21B 43/10* (2006.01)
  *E21B 17/00* (2006.01)
(52) U.S. Cl.
  CPC .......... *E21B 43/108* (2013.01); *F16L 55/163* (2013.01); *F16L 55/1656* (2013.01)
(58) Field of Classification Search
  USPC .................... 138/97, 98; 405/150.1; 264/269
  See application file for complete search history.

(56) References Cited

U.S. PATENT DOCUMENTS

| | | | |
|---|---|---|---|
| 5,186,215 A | 2/1993 | Gilleland | |
| 5,423,352 A * | 6/1995 | Sigel | F16L 55/179 138/93 |
| 5,725,026 A * | 3/1998 | Maimets | F16L 55/163 138/97 |
| 6,138,718 A | 10/2000 | Maimets | |
| 6,250,385 B1 * | 6/2001 | Montaron | E21B 43/086 166/207 |
| 6,516,506 B2 * | 2/2003 | Donnelly | E21B 29/10 29/451 |
| 8,800,650 B2 * | 8/2014 | Spray | E21B 43/103 166/207 |
| 2009/0314409 A1 * | 12/2009 | Ehsani | B29C 63/30 156/60 |
| 2019/0056054 A1 * | 2/2019 | Morissette | F16L 55/179 |

FOREIGN PATENT DOCUMENTS

| | | |
|---|---|---|
| GB | 1026162 | 4/1966 |
| WO | 1998/55795 | 12/1998 |
| WO | 2007/106429 | 9/2007 |

OTHER PUBLICATIONS

International Search Report, PCT/NO2017/050051, dated May 30, 2017.
Written Opinion, PCT/NO2017/050051, dated May 30, 2017.
"Spring Loaded Pipe Lining System", Reinforced Plastics, Elsevier Advanced Technology, New York, NY, US, vol. 53, No. 6, Aug. 1, 2009, p. 14.
Quakewrap: "PipeMedic Bridges the Gap in a Pressurized Pipe", Youtube, Aug. 12, 2010, Retrieved from the Internet: URL:https://www.youtube.com/watch?v=QnO2y3TZDgk.
European Office Action for EP 17714031.6, dated Jan. 27, 2020.

* cited by examiner

LINING AN INTERNAL WALL OF A CONDUIT

CROSS-REFERENCE TO RELATED APPLICATIONS

This application is the U.S. national stage application of International Application PCT/NO2017/050051, filed Feb. 23, 2017, which international application was published on Aug. 31, 2017, as International Publication WO 2017/146593 in the English language. The International Application claims priority of Norwegian Patent Application No. 20160313, filed Feb. 24, 2016. The international application and Norwegian application are both incorporated herein by reference, in entirety.

TECHNICAL FIELD

The present invention relates to conduits and, in particular, it relates to methods of lining part of a wall of a conduit, related apparatus, and liners.

BACKGROUND

There can be a need to line a part of a wall of a conduit such as an internal wall of a pipe, pipeline, tubing, filter or the like. This could be desirable for instance in order to repair or patch over a damaged section of the wall of the conduit, cover equipment (such as a sleeve or a filter) in the wall which may no longer be required, or to bridge over a previously used opening or hole. When space is tight, this can be a particular challenge, e.g. in the context of wells and wellbores such as those common in the oil and gas production and exploration industry where, as the wellbore goes deeper into the subsurface, the diameter of the wellbore typically becomes narrower. During the lifetime of a wellbore, equipment of various kinds may be emplaced (initially or during the life of the well) in the wellbore, such as sand screens, valves, sleeves, plugs, or the like. A sand screen or a sleeve may be installed for instance by running the screen or sleeve into the wellbore and setting packers at its respective ends. It may be desirable after a period of use, e.g. by way of a well intervention, to line part of the wall in the far reaches of the wellbore. The presence of previously installed equipment can reduce access to prevent such an operation from taking place, or may place constraints on the types of equipment, solutions, or processes that can be utilised in order to do so. It is an aim of the invention to obviate or mitigate difficulties or drawbacks associated with prior art techniques, and/or to improve upon prior art techniques in the above field.

SUMMARY

According to a first aspect of the invention there is provided a method of lining at least one part of an internal wall of a conduit, the method comprising the steps of:
(a) providing at least one piece of material to be applied to the wall, the piece of material being curled or rolled up;
(b) providing adhesive;
(c) inserting the rolled or curled up piece of material into the conduit; and
(d) allowing the inserted piece of material to at least partially uncurl or unroll inside the conduit, utilising the adhesive to secure the piece of material in place, so as to apply the material and obtain a laminate which lines said part of the internal wall of the conduit.

The step of allowing the inserted piece of material to at least partially uncurl or unroll inside the conduit is typically performed to position the piece of material at the part of the internal wall of the conduit to be lined. By doing so, once positioned, a section of the piece of material may overlap at least one other section of the piece of material. The positioned piece of material may thus be arranged in layers adjacent to the wall of the conduit where the sections are in overlap.

The laminate may typically comprise a combination of at least one section of the piece of material and the adhesive. For example, the laminate may comprise a combination of the overlapping sections and an amount of the adhesive, or a combination of the layers and an amount of the adhesive. The laminate may typically be a tubular laminate, e.g. if the piece of material is positioned at the part of the internal wall to be lined so as to encircle an inside circumference of the conduit, upon the piece of material at least partially uncurling or unrolling via step d.

The laminate may typically include the adhesive and the layers formed by the overlapping sections of the piece of material.

When positioned at the part of the internal wall of the conduit to be lined, the piece of material may typically be wound in a tubular roll wherein sections of the piece of material overlap such that the roll is provided with layers formed by the sections where the sections are in overlap.

The method may include rolling or curling up the piece of material into a tubular roll. An overlapping region may be formed by the rolling or curling up the piece of material into a tubular roll. In the roll therefore, sections of the piece of material may overlap one another to obtain overlying layers in the roll where the sections are in overlap.

In step a, the piece of material may be rolled or curled up in a tubular roll having a first configuration, and in step c the tubular roll may be inserted end-first into the conduit in the first configuration. The step of allowing the inserted piece of material to at least partially uncurl or unroll inside the conduit may typically be performed to position the piece of material at the part of the internal wall to be lined, such that when positioned the piece of material may be configured in a tubular roll having a second configuration. In the second configuration, the tubular roll may have a larger diameter than in the first configuration.

Through step d, the piece of material in the roll may at least partially unroll or uncurl inside the conduit thereby reducing an extent of the overlap between the sections in overlap. The roll may thus expand diametrically to position the piece of material against the part of the internal wall to be lined. When so positioned, the piece of material may be in overlap such that one section of the sheet overlaps with at least one other section of the sheet. When the piece of material is configured at the part of the wall to be lined in a tubular roll, the laminate obtained may typically be a tubular laminate.

When in overlap e.g. in the roll when positioned against the wall of the conduit, an inner section of the piece of material typically has a greater curvature, or a tighter arc, than an outer section (radially outwardly with respect to a central long axis of conduit). The inner section may thus be nested within the outer section.

An amount of the adhesive may be disposed between an outer surface of the roll and the internal wall of the conduit. An amount of the adhesive may also be disposed between adjacent overlapping sections of the piece of material, e.g.

between an outer surface of a first, inner section and an inner surface of a second, outer section of the piece of material. Typically, an amount of the adhesive may be disposed between any one or more pairs, or each pair of adjacent overlapping sections of the piece of material. The adhesive may thus combine with the sections of the piece of material to produce a laminate which can line the wall of the conduit and which may be secured onto the wall using the adhesive. The laminate can advantageously be very thin whilst providing good sealing opportunity over the part of the internal wall to which the material is applied.

The laminate may typically be a solid structure, and be configured to withstand a pressure differential between an inside of the conduit and an outside of the conduit, e.g. during subsequent use of the lined conduit in conveying a fluid through the conduit.

The piece of material, or the respective sections thereof in overlap, may have a thickness in the range of 0.10 to 0.40 mm. In general, the piece of material, or the respective sections thereof in overlap, may have a thickness of less than 3 mm. For instance, the thickness may be equal to or less than x mm, wherein x can take any value equal to or less than 3. The thickness may typically be less than 2 mm or less than 1 mm. For example, the thickness may be in the range of 0.10 to 1.00 mm or in the range of 0.10 to 0.80 mm. Preferably, the thickness may be in the range of 0.15 to 0.40 mm. The thickness can be considered to be a minimum, average, and/or maximum thickness of the piece of material.

The laminate may typically have a thickness in the range of 0.20 to 3.00 mm.

The adhesive may typically be provided on the piece of material, so as to be carried into the conduit on the piece of material in step c.

The method may further comprise preparing the piece of material in advance. The method may further comprise providing the piece of material with the adhesive prior to being curled or rolled up. The piece of material may thus be rolled or curled up with the adhesive applied to the material. The method may further comprise spreading the adhesive across a surface of the piece of material. The method may include applying the adhesive to either or both sides of the piece of material to prepare the material in advance.

Through step d, the adhesive can be urged against the wall. The adhesive may be further utilised in step d to seal between the piece of material and said part of the internal wall of the conduit.

The piece of material may be configured to be flexible and resilient. Hence, the piece of material may respond resiliently to flexure, e.g. as a spring. Thus, in step d the piece of material may exert a resilient force component in response to being rolled or curled up by which the piece of material may be urged to at least partially uncurl or unroll inside the conduit. The material may be urged toward and against the wall. In this way, the piece of material may be positioned at the wall of the conduit. Accordingly, the piece of material may be applied against the wall by the structure expanding radially when it at least partially uncurls or unrolls.

The piece of material may preferably comprise a sheet, typically a spring steel sheet. More generally, the sheet may be a plastics sheet or metal sheet.

The method may further comprise releasing the piece of material once positioned inside the conduit to let the piece of material at least partially uncurl or unroll, so as to emplace the piece of material on the wall.

The piece of material may be provided on a running tool, e.g. an inserter tool. The method may further comprise:

running the inserter tool into the conduit to position the curled or rolled up material therein; and releasing the piece of material from the inserter tool, in order to let the piece of material at least partially uncurl or unroll.

The piece of material may be provided on an inserter tool in a first configuration. The method may include running the inserter tool to a desired location in the conduit; and releasing the piece of material from the inserter tool at the desired location. The inserter tool may be configured to hold the piece of material in the first configuration while the inserter tool is inserted into the desired location in the conduit. The piece of material may then be released so as to at least partially uncurl or unroll inside the conduit into a second configuration, in which the piece of material may be positioned at the part of the wall of conduit to be lined.

The method may further comprise moving the inserter tool out of the conduit, leaving the piece of material in place against the wall. The piece of material may typically expand radially within conduit upon at least partially uncurling or unrolling in step d.

The piece of material may at least partially uncurl or unroll under a resilient force component exerted by the piece of material.

The method may include either or both of the steps of:
applying the adhesive to the piece of material; and
rolling up or curling up the piece of material with the adhesive applied, such that once rolled or curled up the piece of material can be inserted into the conduit.

The method may further comprise: using a heater which is provided on part of the inserter tool to heat the piece of material to post-cure the adhesive, so as to utilise the adhesive to secure the piece of material in place.

The adhesive may be configured to sealingly secure the piece of material onto the wall of the conduit. In this way, a fluid tight seal between the piece of material and the internal wall of the conduit may be produced by the adhesive. Accordingly, the material may be applied to the wall to isolate an interior of the conduit from a region outside the wall.

The piece of material may be provided with a sealer, wherein the sealer may seal between the piece of material and the internal wall of the conduit, upon the material being applied to the wall. The sealer may be configured for sealing between the resilient sheet and the wall of the conduit. The sealer may accordingly be seated between the resilient sheet and the wall to which the sheet is applied upon applying the sheet. The adhesive may together with the sealer provide for sealing and adhesion of the piece of material to the wall of the conduit, upon performing step d.

The sealer may be a sealant. The sealer may comprise a body of rubber, e.g. an elastomer seal, or may comprise a swellable material. The swellable material may be adapted to swell in response to the environment in the conduit, e.g. in response to a particular fluid contained in the conduit, such as for instance any of oil, water, and/or gas. The swellable material may be adapted to swell in response to a property of the fluid in the conduit. The swellable material may be adapted to swell after exposure to the environment of the fluid for a certain period of time. The sealer may comprise a swelling agent for activating the swellable material to swell. The adhesive may be adapted to initiate swelling of the swellable material for sealing between the internal wall of the conduit and the piece of material.

The method may include providing a structure on the piece of material for reinforcing the laminate. The method may include embedding at least some of the adhesive in a structure, e.g. a sponge or net structure provided on the piece of material, e.g. on a surface on either or both sides of the piece of material. This may help to reinforce the laminate. The material of such structures, e.g. the net may comprise carbon or another material. The adhesive may be embedded before rolling or curling up the piece of material.

The conduit may typically comprise wellbore tubing. The conduit may thus be a wellbore conduit. The conduit may comprise a section of casing or a section of a liner in a wellbore. The wellbore may be a wellbore of an oil and gas well.

More generally, the conduit may comprise any type of pipe or tubing for carrying any type of fluid. Such a fluid may be in the form of liquid or gas, or a combination thereof. In embodiments where the conduit comprises wellbore tubing, the fluid carried in the tubing may comprise a well fluid, such as for instance production fluid comprising hydrocarbons from the Earth's subsurface. The conduit may comprise a pipe or tubing for use in an oil and gas wellbore. The conduit, pipe and/or tubing may comprise one or more tubulars of metal (e.g. steel), composite, or plastics materials. The pipe or tubing may comprise steel, composite or plastics tubulars for use in an oil and gas well. The conduit may comprise a pipe or tubing for conveying and distributing water. The pipe or tubing may comprise steel or plastics tubulars used for conveying and distribution of cold or hot water. The conduit may comprise a pipe or tubing for soil and waste or for conveying or distribution of gas. The pipe or tubing may comprise steel, plastic or composite tubulars for distribution of gas, or may comprise plastic or concrete tubulars for soil and waste.

The adhesive may typically comprise at least one of: epoxy; glue; thermoset adhesive; single-component adhesive; two-component adhesive; heat-responsive adhesive; a combination thereof; or any other suitable adhesive. Preferably, the adhesive may be capable of sealing and securing the piece of material in place inside and/or onto the wall of the conduit. The adhesive may be configured to be activated, e.g. to soften and set, by a temperature in the conduit exceeding an activation temperature of the adhesive. Accordingly, activation of the adhesive may advantageously be delayed until the piece of material is brought into position at the part of the wall of the conduit to be lined. If required environmental heat is not present, an integrated heater device which is built into the running tool may be used to assist the adhesive to settle and/or cure.

The piece of material may comprise a piece of sheeting, netting, membrane, lining, or fabric. The material may comprise metal; plastics; thermoset material; composite; or a suitable combination thereof, e.g. suitable for the piece of material to respond resiliently to flexure, for exerting a resilient force in response to flexure such that the piece of material least partially unrolls or uncurls inside the wellbore, e.g. to urge the piece of material into position against the internal wall of the conduit.

The part of the wall to be lined may have at least one opening, and the curled or rolled up piece of material may be released such that through step d the piece of material is positioned to cover over the opening. The obtained laminate may thus cover over the opening. The opening may comprise any one or more of: a perforation; a hole produced e.g. due to corrosion; and a fluid passageway through the wall. The opening may comprise an opening in a sand screen, or any type of sleeve on the wall of the conduit.

The part of the wall to be lined may be a known weak or corroded area in the wall of the conduit. The piece of material may thus be applied such that the piece of material and/or the obtained laminate covers over the weak area. In this way, the week area may advantageously be protected, e.g. from exposure to corrosive or otherwise harmful fluid inside the conduit. The laminate may at the same time prevent leakage as may previously have been encountered through the weak and/or corroded area.

The part of the wall to be lined may include a sleeve or similar, e.g. a sliding sleeve, or other structure on the wall; a valve; a sand screen. Through step d, the material may be applied such that the piece of material and/or the obtained laminate covers over the sleeve or other structure on the wall. The piece of material and/or the laminate may preferably form a seal to isolate the sleeve or other structure from the interior of the conduit.

According to a second aspect of the invention there is provided apparatus for lining at least one part of an internal wall of a conduit, the apparatus comprising: at least one piece of material; and adhesive; the piece of material being configured to be curled or rolled up to allow insertion into the conduit and being further configured to be allowed to at least partially uncurl or unroll inside the conduit once inserted therein in use, for securing the piece of material in place utilising the adhesive, for applying the piece of material and obtaining a laminate on said part of the internal wall of the conduit.

According to a third aspect of the invention there is provided apparatus for lining at least one part of an internal wall of a conduit may be an apparatus comprising at least one piece of material and adhesive, the piece of material being configured to be curled or rolled up to allow insertion into the conduit and being further configured to be allowed to at least partially uncurl or unroll inside the conduit once inserted therein in use, for securing the piece of material in place utilising the adhesive, for applying the piece of material and obtaining a laminate on said part of the internal wall of the conduit, the material being configured so as to exert a resilient force component in response to being rolled or curled up, by which the piece of material may be urged to at least partially uncurl or unroll inside the conduit upon release.

The adhesive may be applied to the piece of material, e.g. by spreading onto a surface of the piece of material.

An amount of the adhesive may typically be applied with a greater thickness. This amount of the adhesive may be used to be disposed in contact with the internal wall of the conduit, between an outside section of the piece of material and the wall.

The piece of material may be provided with a structure, e.g. a sponge structure in which an amount of the adhesive may be embedded.

The piece of material may be provided with a structure for reinforcing the laminate. An amount of the adhesive may be embedded in the structure for reinforcing the laminate. The structure may be a woven structure. The structure may comprise webbing, netting or sponge structure or the like.

The piece of material may typically have a thickness in the range of 0.20 to 0.40 mm.

The adhesive may typically be capable of sealing and securing the piece of material in place on the wall of the conduit. The adhesive may be configured to be activated to soften and set by a temperature in the conduit exceeding an activation temperature of the adhesive.

The piece of material may be provided with a sealer for sealing between the piece of material and the wall of the conduit. In this way, the adhesive in combination with the sealer may provide for sealing and adhesion of the piece of material to the wall of the conduit to obtain the laminate.

Either or both of the leading and trailing edges of the piece of material, with reference to the direction of curl or roll, may have at least one edge formation such as for example prongs or teeth e.g.

formed by way of cut-outs in the edge, or some other suitable edge formation. The piece of material may have a pronged edge for facilitating either or both of: rolling or curling up the lining; and partial unrolling or uncurling of the piece of material upon release. In this way, the piece of material may advantageously be able to be rolled up and/or at least partially unrolled more easily when sections of the piece of material are arranged overlapping configuration. Crinkling of the piece of material upon rolling or unrolling (e.g. due to contact between overlapping inner and outer sections of the piece of material as they move relative to one another upon rolling or unrolling) may thus be reduced or avoided. The edge formation may facilitate even or uniform expansion of the rolled and/or curled up piece of material towards the wall of the conduit upon release.

The apparatus may typically further comprise installation equipment which may typically include a tool, e.g. a running tool such as the inserter tool, comprising mandrel for supporting the piece of material in a curled or rolled up configuration around the mandrel; and at least one retainer arranged retain the piece of material in the rolled or curled up configuration during insertion.

The retainer may be activated to release the piece of material from the tool when positioned in the conduit. The retainer may comprise at least one sleeve, typically at least one movable sleeve. The tool may further comprise at least one hydraulic or electric actuator for moving the sleeve along the mandrel to release the piece of material.

The tool may comprise a housing for containing the piece of material inside the housing when rolled or curled up. The sleeve may be arranged to slide over the piece of material upon the mandrel for retaining and/or containing the piece of material in the housing between the sleeve and the mandrel. The sleeve may be configured to retain the piece of material on the inserter tool in the rolled or curled up condition. The sleeve may be movable, e.g. axially (relative to the mandrel) to release the piece of material. The movement of the sleeve may be initiated using at least one actuator, such as at least one hydraulic actuator. The tool may be connected to a running string, for running the tool into the conduit. Upon releasing the sheet from the tool when inside the conduit, one or several sections of the housing may be axially pulled apart for releasing the sheet inside the conduit.

The tool may further comprise a heater device. Accordingly, the heating device may be provided as part of the tool, e.g. integrated with a part of the tool. The piece of material may be released from the tool once positioned in the conduit. The heating device may produce heat for facilitating activation and/or post-curing of the adhesive for securing the piece of material in place inside the conduit, e.g. if the temperature of the environment inside the conduit is not suitable. The heating device may be configured for heating an environment inside the wellbore. The heating device may be arranged to heat any of: the internal wall of the conduit; the piece of material; and the adhesive. This may activate and/or accelerate a curing process for curing the adhesive and/or a sealant when the piece of material is positioned at the wall. This may advantageously reduce the overall time for performing the method or operation.

According to a fourth aspect of the invention there is provided a method of lining at least one part of an internal wall of a conduit, the method comprising the steps of:

(a) providing at least one piece of material to be applied to the internal wall, the piece of material being curled or rolled up to allow insertion into the conduit;

(b) providing a sealer:

(c) inserting the rolled or curled up piece of material into the conduit; and (d) allowing the inserted piece of material to at least partially uncurl or unroll inside the conduit, utilising the sealer between the piece of material and the internal wall of the conduit to seal therebetween, so as to apply the material and obtain a laminate which lines said part of the internal wall of the conduit.

The sealer may comprise adhesive. The sealer may comprise sealing means. The sealing means may for instance comprise a sealant, of a swellable body, and/or a sealing member such as a rubber seal or the like. The piece of material may be provided with adhesive. In embodiments with sealing means, the sealing means may be separate from the adhesive. The sealant may be an adhesive. The adhesive may be as described in relation to any of the other aspects of the invention.

According to a fifth aspect of the invention there is provided apparatus for lining at least one part of an internal wall of a conduit, the apparatus comprising at least one piece of material and at least one sealer, the piece of material being configured to be curled or rolled up to allow insertion into the conduit and being further configured to be allowed to at least partially uncurl or unroll inside the conduit once inserted therein in use, for allowing the sealer to seal between the piece of material and the internal wall of the conduit, for applying the piece of material and obtaining a laminate for lining said part of the internal wall of the conduit.

According to a sixth aspect of the invention there is provided a liner produced by applying the apparatus of the second, third or fifth aspects, or by performing the method of the first or fourth aspects, wherein the liner comprises the laminate.

The laminate may comprise an outer layer of the piece of material which may be arranged in overlap with at least one inner layer of the piece of material, wherein the inner and outer layers are integrated with and secured in place by the adhesive.

According to a seventh aspect of the invention there is provided a conduit lined with the liner of the sixth aspect.

According to an eighth aspect of the invention there is provided installation equipment for applying the apparatus of the second, third or fifth aspects in the conduit or in performing the method of the first or fourth aspects, the equipment being configured to be inserted into the conduit.

The installation equipment may be further defined as described in relation to the second aspect.

According to an ninth aspect of the invention there is provided a method of lining at least one part of an internal wall of a conduit, the method comprising the steps of:

(a) providing at least one piece of material to be applied to the wall, the piece of material being rolled up in a rolled-up configuration;

(b) providing adhesive;

(c) inserting the piece of material into the conduit, retaining the piece of material in the rolled-up configuration; and (d) releasing the piece of material, the piece of material responding resiliently such that the piece of material is positioned onto the wall, the adhesive being utilised to secure the piece of material in place, so as to apply the material and obtain a laminate which lines said part of the internal wall of the conduit.

According to a tenth aspect of the invention there is provided a method of lining at least one part of an internal wall of a conduit, the method comprising the steps of:
(a) providing at least one piece of material to be applied to the wall, the piece of material being rolled up in a rolled-up configuration;
(b) providing a sealer;
(c) inserting the piece of material into the conduit, retaining the piece of material in the rolled-up configuration; and
(d) releasing the piece of material, the piece of material responding resiliently such that the piece of material is positioned onto the wall, the sealer being utilised to seal between the piece of material and the wall, so as to apply the material and obtain a laminate which lines said part of the internal wall of the conduit.

According to an eleventh aspect of the invention there is provided apparatus for performing either of both of the ninth or tenth aspects of the invention, the apparatus comprising the piece of material and either the adhesive (for performing the ninth aspect), or the sealer (for performing the tenth aspect).

Any of the above aspects of the invention may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Various further advantages of the invention and its features are described and will be apparent from the specification throughout. In particular, the invention can have advantages in convenience, versatility and ease of application to produce a laminate which lines part of an internal wall conduit, and which can be thin but strong and can seal to give pressure containment. The conduit may advantageously be lined quickly, reliably, and predictably.

BRIEF DESCRIPTION OF THE DRAWINGS

There will now be described by way of example only, embodiments of the invention with reference to the accompanying drawings in which.

Detailed Description Of The Drawings

Figure 1:
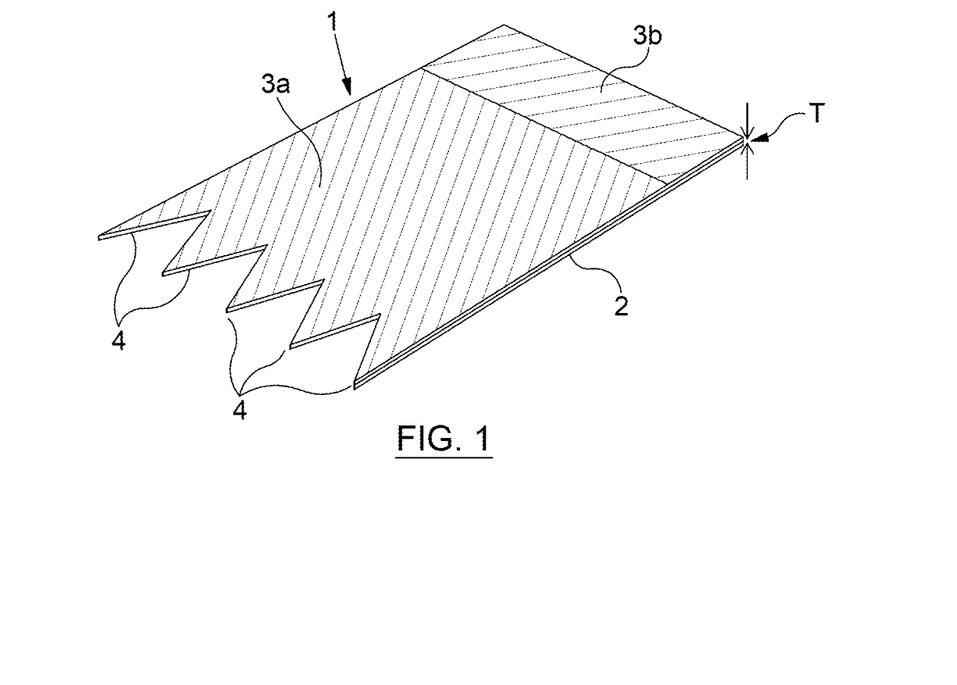
FIG. 1 is a perspective representation of a sheet for use in lining a part of an internal wall of a conduit according to an embodiment of the invention.

With reference first to FIG. 1, there is depicted apparatus comprising a piece of material 1 which is to be used to line an internal wall of a conduit. The piece of material 1 is in the form of a steel sheet 2 and has adhesive 3a, 3b applied onto a surface of the sheet 2. The adhesive 3b on part of the sheet surface is typically thicker than the adhesive 3a, since it is intended that the part carrying the adhesive 3b will be brought into contact with the internal wall of the conduit to secure the sheet 2 in place and obtain a laminate. The adhesive may in this way accommodate possible differences in relief in the wall and can still maintain good bonding and sealing to the wall.

The sheet 2 preferably comprises spring steel sheeting with a thickness T typically not exceeding 0.40 mm, although other thicknesses and other kinds of material for the sheet, as described elsewhere herein, may also function equally well. The sheet 2 is flexible and resilient so that when it is flexed, e.g. rolled or curled up into a tubular roll, forces are produced in the material of the sheet which tend to restore the sheet back to its original or another preferred configuration. In this sense, the sheet 2 can be configured to behave as a spring. The sheet may also have variations in thickness, such that one section of the sheet may have one thickness, and another section may have another thickness.

Figure 2:
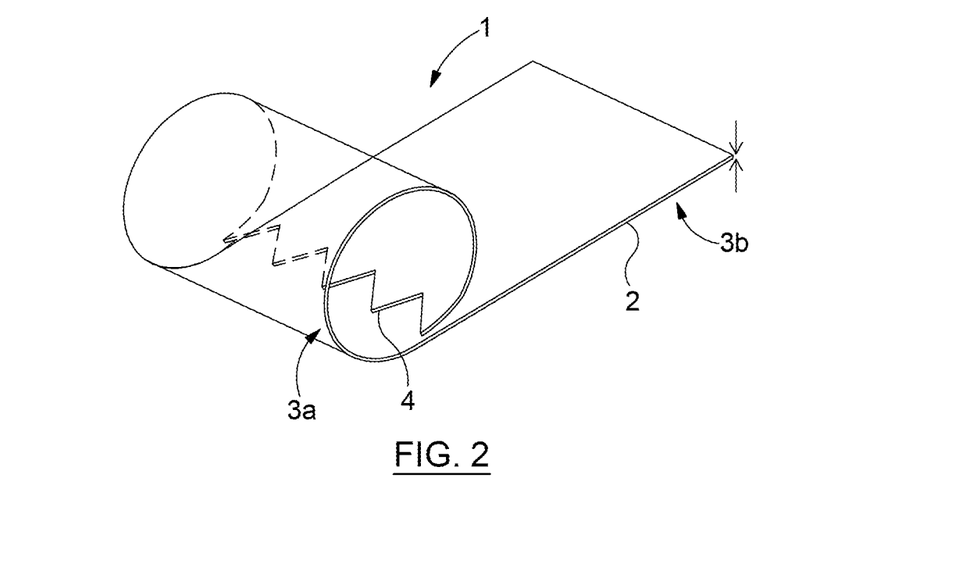
FIG. 2 is a perspective representation of the sheet of FIG. 1 whilst being rolled up.
Figure 3:
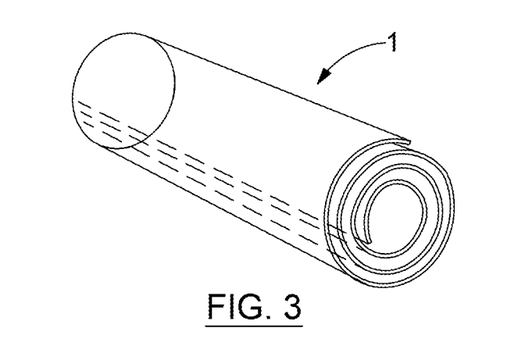
FIG. 3 is a perspective example of a sheet in a rolled-up configuration.

With further reference now to FIGS. 2 and 3, in order to apply the sheet 2 to the wall of the conduit, the sheet 2 is rolled up into a tubular rolled-up configuration, allowing the sheet to be inserted end-first into the conduit. In the rolled-up configuration, the rolled-up lining has a diameter that is smaller than that of the conduit to allow insertion. FIG. 3 illustrates a typical such rolled-up configuration.

As seen in FIG. 2, a first section of the sheet 2 is turned into overlap within a second section of the sheet 2, and is provided with edge prongs 4 which contact against an inside of the second section. The edge prongs 4 help to increase the flexibility of the sheet 2 in the first section, and can help both to prevent crinkling and to curl and roll up the sheet 2 evenly into the roll configuration.

The sheet 2 is rolled up with the applied adhesive 3a, 3b faced outwardly in the tubular roll. The applied adhesive 3a, 3b sticks to and stays in place on the surface of the sheet 2 after it is applied, and during rolling, such that the adhesive does not stick to overlapping sections of the sheet 2 which are curled around and brought into contact with the adhesive as the rolling-up process progresses.

Figure 4:
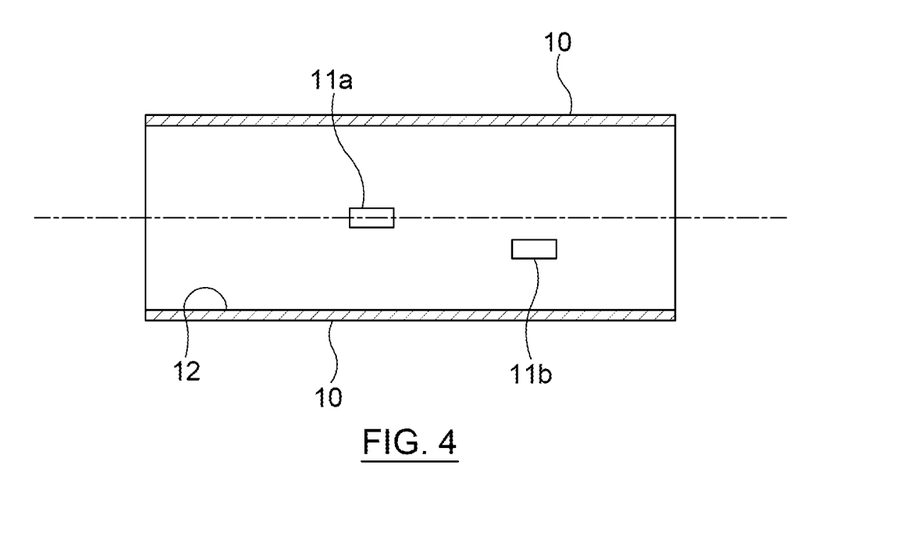
FIG. 4 is a sectional representation of a pipe with wall openings.
Figure 5:
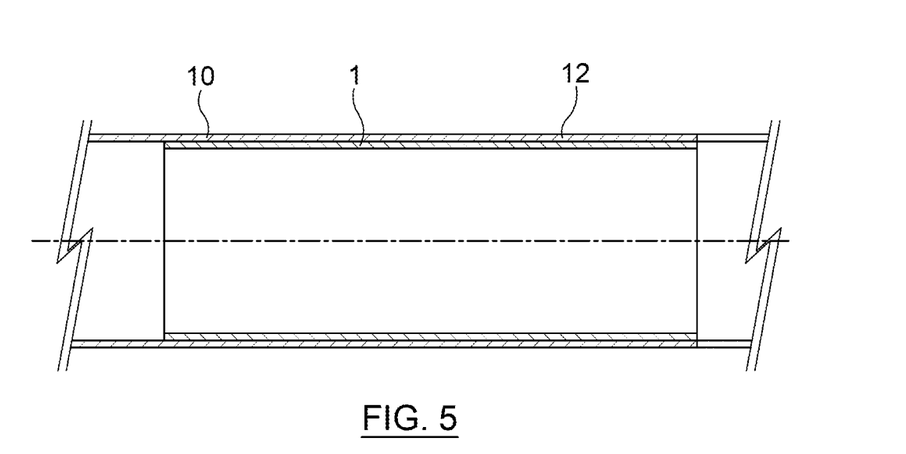
FIG. 5 is a sectional schematic representation of the pipe of FIG. 4 with the lining of FIG. 1 applied.

Once rolled-up, the sheet 2 is inserted into the conduit, and with reference now additionally to FIGS. 4 and 5, an example such a conduit is illustrated in the form of a pipe 10 which is to be lined using the sheet 2. As seen in FIG. 4, the pipe 10 has two openings 11a, 11b which extend through a wall 12 of the pipe 10. These openings may for instance allow fluid access between an interior of the pipe 10 and a region outside of the pipe 10.

The rolled up sheet 2 is positioned in the desired location adjacent to the openings 11a, 11b, and is then allowed to unroll somewhat such that the sheet 2 is brought into position against the wall 12, covering over the openings 11a, 11b, as indicated in FIG. 5. The sheet 2 unrolls by itself due to the inherent resilience in the material of the sheet 2 upon being free to unroll or unravel from the initial rolled up configuration. The sheet 2 can be inserted in any convenient way, for example with the assistance of an inserter tool which holds the sheet 1 in the initial rolled up configuration during insertion and from which the sheet 2 can be released, but it will be appreciated that in other variants or in particular contexts, the rolled-up sheet 2 may be prepared in some other way to allow the sheet to unroll by itself when inside the conduit, or may for example be deployed by hand, depending upon the application.

Thus, by way of letting the sheet 2 unroll, the sections of the sheet 2 can self-position against the wall 12 of the pipe 10, and can adapt to the internal diameter of the pipe. The sheet partially unrolls under a resilience force of the sheet and expands diametrically so that it is urged against the wall 12. After a period of time inside the pipe 10, at a temperature exceeding an activation temperature of the adhesive, the adhesive 3a, 3b activates and sets, such that the sheet 2 is secured to the wall 12 by means of the adhesive 3a, 3b, and forms a laminate on the wall of the wellbore. The adhesive 3a, 3b functions as part of the laminate both to adhere the sheet 2 in place and provide a fluid-tight seal between the sheet 2 and the wall 12. The adhesive 3b forms a bond between the wall of the wellbore and an outside of the sheet 2, and the adhesive 3a forms a bond between overlapping sections of the sheet 2. Upon exceeding the activation temperature, the adhesive 3a, 3b typically softens before setting and bonding.

Figure 6:
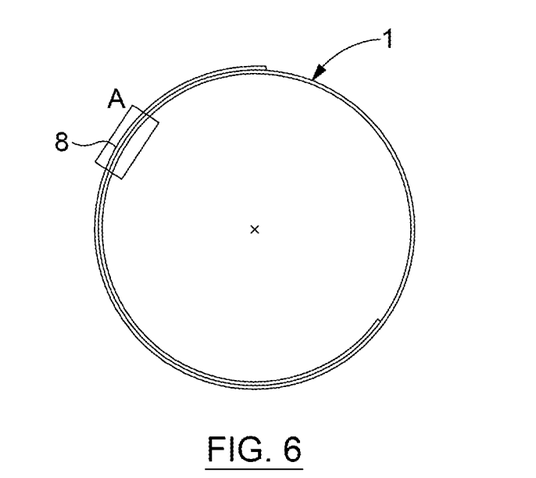
FIG. 6 is an end-on representation of the sheet once applied in a pipe.
Figure 7:
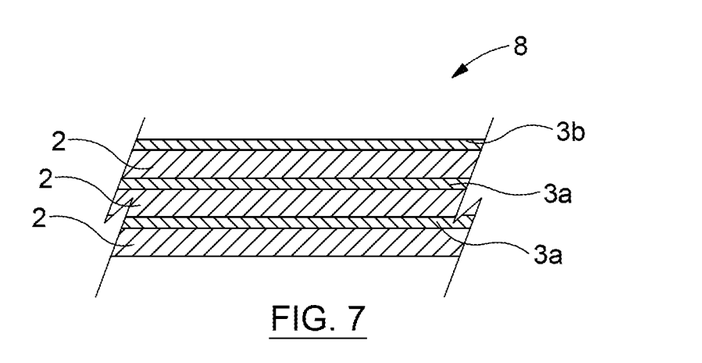
FIG. 7 is a close up representation of the sheet of FIG. 6 in the region A.

Referring additionally to FIGS. 6 and 7, a typical configuration of the sheet 2 after expansion inside the pipe 10 is illustrated where sections of the sheet 2 overlap and a thin laminate 8 is produced on the wall 12 of the pipe 10. The laminate 8 is formed on the wall 12 of the pipe by a layering of curved overlapping sections of the steel sheet 2 and the adhesive 3a, 3b. The laminate 8 thus provides a liner structure that is well bonded and sealed to the pipe 10 and can isolate between the interior of the pipe 10 and a region behind the wall 12.

Figure 8:
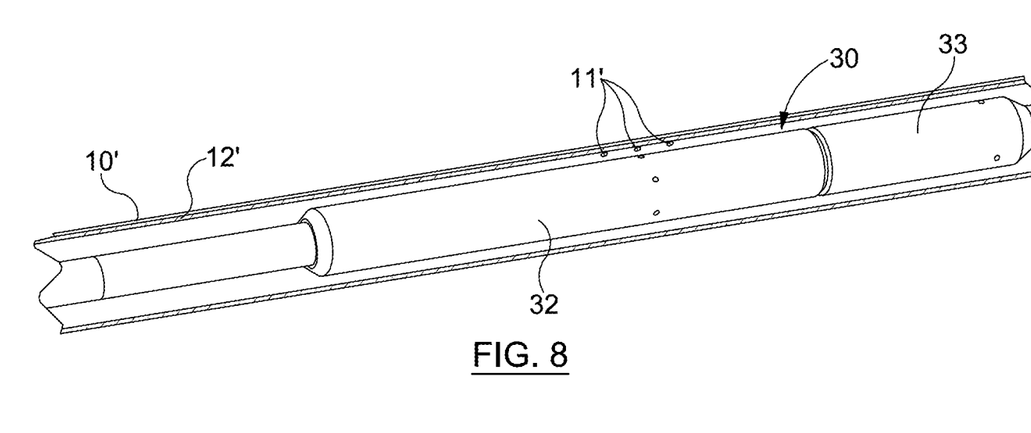
FIG. 8 is a representation of a step in a process of applying a sheet to a wall of a wellbore according to an embodiment of the invention.
Figure 9:
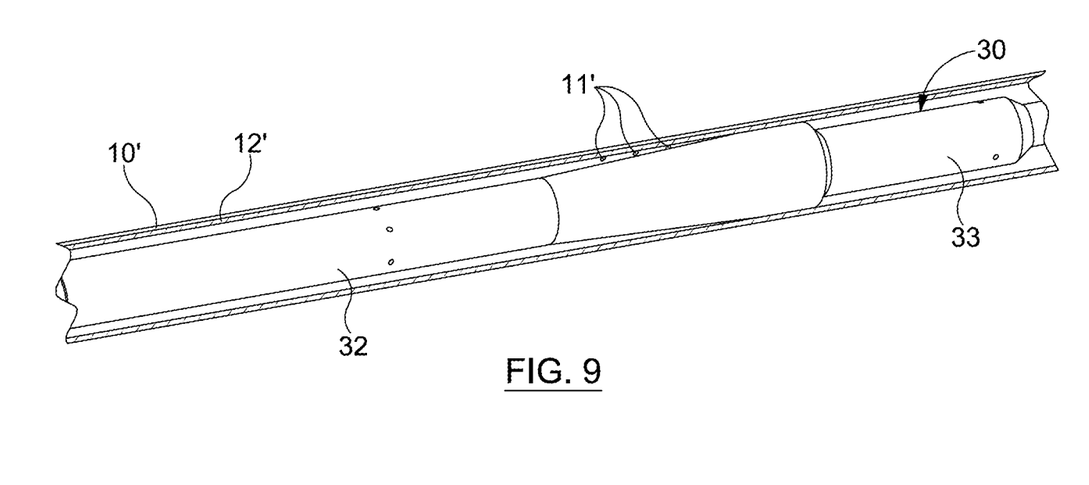
FIG. 9 is a representation of a further step in the process of FIG. 8.
Figure 10:
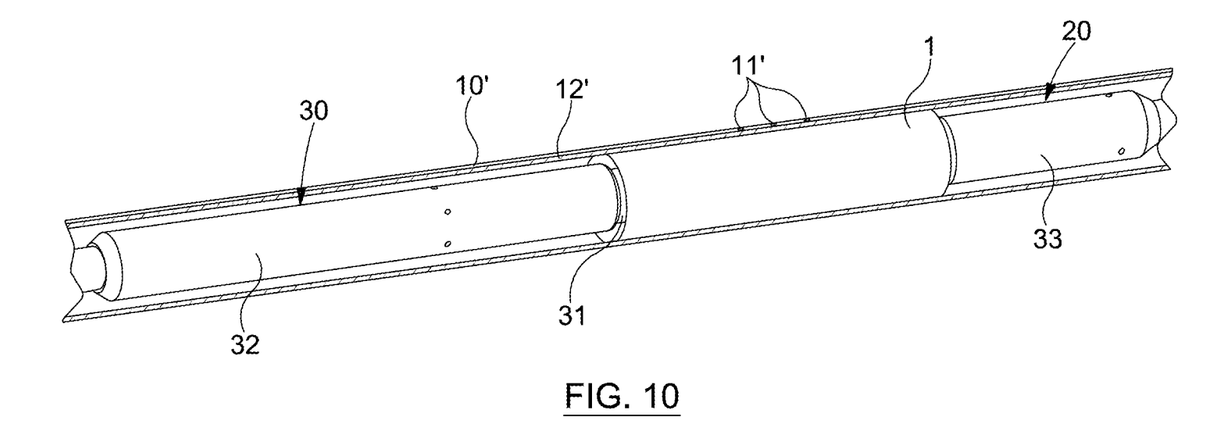
FIG. 10 is a representation of a yet further step in the process of FIG. 8.

Turning now to FIGS. 8 to 10, a process of applying the sheet 2 to a wall of a wellbore tubular 10' is illustrated, the process being carried out with the assistance of an inserter tool 30. The inserter tool 30 is connected to a string which is run into the wellbore from the surface, e.g. on a wireline, or coiled tubing or the like. In this example, the sheet 2 is rolled up around a mandrel 31 of the inserter tool 30, and is retained in the rolled up configuration by upper and lower retainer sleeves 32, 33 which are operable to retain the sheet 2 in the rolled up configuration. In FIG. 8, the sheet 2 is housed within the first and second retainer sleeves 32, 33, preventing radial expansion of the sheet 2 onto the wall, until the sheet 2 is brought into the desired position inside the tubing 10'. In FIG. 9, the sheet 2 is being released from the inserter tool 30. As can be seen, the first retainer sleeve 32 is moved uphole along the mandrel 31 away from the second retainer sleeve 33. A lower end of the rolled-up sheet 2 becomes exposed to the wellbore, and begins to unravel and expand resiliently toward the wall 12' of wellbore tubing 10'. In FIG. 10, the first retainer sleeve 32 is fully retracted along the mandrel 31, allowing the other end of the rolled up sheet 2 to release. As can be seen, the lining 1 has partially unrolled into engagement with the wall 12' of the wellbore tubing 10', covering over previously formed holes 11' in the wall 12'. The adhesive 3a, 3b on the sheet 2 then activates to secure and seal the sheet 2 in place on the wall 12' and form a laminate. The first and second retainer sleeves 32, 33 are movably mounted on the mandrel 31, and are moved apart by hydraulic fluid pushing on a reaction surface on either or both of the sleeves 32, 33. The inserter tool 30 may be activated through a signal delivered though an electrical cable to operate a hydraulic or electric actuator so that the retainer sleeves 32, 33 are driven to either side. It will be appreciated that other actuation mechanisms may be employed and/or other kinds of retainers. The use of retainer sleeves 32, 33 as shown may be beneficial in that the lining 1 can be protected somewhat from the wellbore environment until the desired installation location in the wellbore is reached.

An example is now described of how the adhesive 3a, 3b may be prepared and applied to the sheet 2 and utilised for applying the sheet 2 to the wall 12, 12' of a conduit to obtain a laminate.

For purposes of this example, the sheet 2 can comprise a flexible spring steel sheet with an average total thickness dimension of around 0.25 mm, and the surface of the wall to which the sheet is applied may also comprise steel, such as that typical of casing sections used in a wellbore.

The adhesive 3a, 3b is prepared by mixing together constituent components of the adhesive at a temperature above 50° C., at which temperature the mixture has a liquid consistency allowing the components to be readily stirred and mixed.

Once the components are fully mixed in, the mixture is spread over the sheet 2 (whilst still heated above 50° C.) in liquid form, and is left to cool down so that the mixture begins to "dry" and forms a thin film of adhesive on the steel sheet. The adhesive 3b in the section which is intended to form a seal against the wall of the tubular is applied more thickly, and may typically have a thickness of approximately 1 to 3 mm. When cooled down to a typical ambient room temperature of e.g. in the range of 20-22° C., the adhesive becomes a highly viscous non-sticky fluid with a degree of flexibility. In this condition, the sheet 2 with the applied adhesive 3a, 3b is rolled up, while the adhesive 3a, 3b remains highly flexible and complies with the deformation and flexure of the sheet 2 as it is rolled or curled up (and/or when unrolled or uncurled). The sheet 2 can thus be rolled up with the applied adhesive 3a, 3b and placed into the inserter tool 30.

When the inserter tool 30 is run into a wellbore, the temperature may typically increase above 50° C. which will activate the adhesive. The adhesive 3a, 3b then softens (becomes a low-viscous fluid), and sets to secure and adhere the sheet in place on the wall of the wellbore, and forming a seal between an outside of the sheet and the wall. The adhesive may be sufficiently viscous to prevent flow under gravity. The adhesive setting process can commence when remaining above the activation temperature for a certain pre-defined period of time. The onset of the setting process for the adhesive 3a, 3b can be adjusted, e.g. by the choice of the constituent components mixed into the adhesive. By appropriate selection, the onset of the setting process can be delayed by for example 1 to 10 hours after being exposed to a temperature above 50° C. Preferably, the adhesive 3a, 3b is configured so that the setting process does not take place before the steel sheet 2 has been released onto the wall of the wellbore. This can help to allow the sheet to unroll into place on the wall without the adhesive adversely interfering with the unrolling of the sheet 2.

Accordingly, the adhesive may be a thermosetting adhesive. The adhesive may for example comprise epoxy resin. In other examples, the adhesive may be of another type such as any of those adhesives described elsewhere herein.

In various other embodiments, the sheet may be provided with a sealer in addition to or in place of the adhesive. The sealer may be provided on the sheet and be rolled up with the sheet into a rolled configuration. Then, once inserted into the conduit, the sheet may unroll to produce a laminate and the sealer may be placed between the sheet and the wall of the conduit and seal therebetween, and held in place by the sheet of the laminate. The sealer may be in the form of a strip of rubber or swellable material provided on a surface of the sheet. The sheet may otherwise be deployed and applied to the wall of a conduit in a corresponding manner to that of the sheet 2 as described above.

Figure 11:
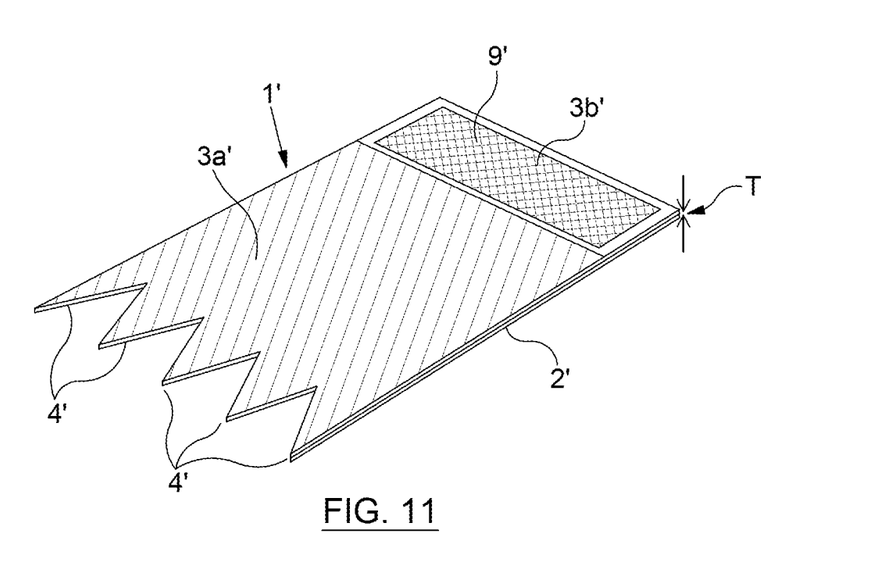
FIG. 11 is a perspective representation of a sheet for use in lining a part of an internal wall of a conduit according to another embodiment.

With reference to FIG. 11, a piece of material 1' in the form of steel sheet 2' is illustrated where a structure 9' is provided on part of the sheet for reinforcing the laminate which is produced when applying the sheet to an internal wall of a conduit. The structure 9' in this example is illustrated in the form of netting. In other variants, the structure can 9' can have other forms such as a sponge or webbing. Adhesive 3a' is provided on one part of the sheet 2', and a further amount of adhesive 3b' is embedded in the structure 9' on another part of the sheet 2'. The adhesive 3b' and structure 9' is on the part of the sheet which is placed outermost in the rolled up sheet for facing the internal wall of the conduit to be lined. The structure 9' may help to give stability and strength to the sheet 2' to support it in position against the wall. It will be appreciated that the piece of material 1' can be applied in the same manner as that of the piece of material 1 in the embodiments described above, and the adhesive 3a', 3b' may have the same properties as the adhesive 3a, 3b.

In embodiments using a sealer, the part of the sheet 2' with the structure 9' with the embedded adhesive 3b' may instead comprise a sealer, such as an elastomer seal or swellable material for sealing against the wall, to be positioned between the outermost part of the piece of material and the internal wall of the conduit when deployed in the conduit. Sealing by use of the sealer can be beneficial for fluid and pressure containment in the conduit.

It will be appreciated that the methods and techniques described herein may be used, and may be particularly useful, e.g. to line a part of a wall of a wellbore conduit in a well intervention operation, although they may also be equally useful as part of other kinds of operation and with other types of conduit.

Various modifications and improvements may be made without departing from the scope of the invention herein described.

The invention claimed is:

1. A method of lining at least one part of an internal wall of a conduit, the method comprising:
    (a) providing at least one piece of material to be applied to the wall, the piece of material being curled or rolled up, and wherein the piece of material comprises a spring steel sheet having a thickness in the range of 0.2 to 0.4 mm;
    (b) providing adhesive;
    (c) inserting the rolled or curled up piece of material into the conduit; and
    (d) allowing the inserted piece of material to at least partially uncurl or unroll inside the conduit, utilizing the adhesive to secure the piece of material in place, so as to apply the material and obtain a laminate which lines the part of the internal wall of the conduit.

2. The method as claimed in claim 1, wherein by allowing the inserted piece of material to at least partially uncurl or unroll inside the conduit, the piece of material is positioned at the part of the internal wall of the conduit, such that when positioned a section of the piece of material overlaps at least one other section of the piece of material, whereby the piece of material is arranged in layers on the wall of the conduit where the sections are in overlap, and the laminate comprises a combination of the layers and the adhesive.

3. The method as claimed in claim 1, wherein the piece of material is configured to be flexible and resilient, such that in step d the piece of material exerts a resilient force component in response to being rolled or curled up by which the piece of material is urged to at least partially uncurl or unroll inside the conduit, in order to apply the material and obtain the laminate on the part of the internal wall of the conduit.

4. The method as claimed in claim 1, wherein the piece of material has a pronged edges whereby the pronged edges engages with an overlapping section of the piece of material or the internal wall of the conduit to ease the performance of either or both of:
    i) rolling or curling up the lining; and ii) partial unrolling or uncurling of the piece of material.

5. The method as claimed in claim 1, wherein in step (a), the piece of material is rolled or curled up in a tubular roll having a first configuration, and wherein through step (d), the piece of material at least partially uncurls or unrolls to expand the roll radially, such that the tubular roll obtains a second configuration in which a section of the piece of material overlaps at least one other section of the piece of material, the piece of material being arranged in layers where the sections are in overlap.

6. The method as claimed in claim 1, wherein the laminate has a thickness of 0.2 to 3.00 mm.

7. The method as claimed in claim 1, the adhesive being provided on one or either side of the piece of material, so as to be carried into the conduit on the piece of material in step (c).

8. The method as claimed in claim 1, further comprising providing the piece of material with the adhesive prior to being curled or rolled up.

9. The method as claimed in claim 1, wherein the adhesive is further utilized in step (d) to seal between the piece of material and the part of the internal wall of the conduit.

10. The method as claimed in claim 1, further comprising releasing the piece of material once positioned inside the conduit to let the piece of material at least partially uncurl or unroll, so as to emplace the piece of material on the wall.

11. The method as claimed in claim 1, wherein the piece of material is provided on an inserter tool and the method further comprises:
    running the inserter tool into the conduit to position the curled or rolled up material therein; and
    releasing the piece of material from the inserter tool, in order to let the piece of material at least partially uncurl or unroll.

12. The method as claimed in claim 11, further comprising moving the inserter tool out of the conduit, leaving the piece of material in place against the wall.

13. The method as claimed in claim 11 further comprising: providing a heater as part of the inserter tool; and when the inserter tool is inserted inside the conduit, using the heater to heat the piece of material to cure or post-cure the adhesive, so as to utilise the adhesive to secure the piece of material in place.

14. The method as claimed in claim 1, wherein the piece of material is provided with a sealer, and the sealer seals between the piece of material and the internal wall of the conduit, upon the material being applied to the wall.

15. An apparatus for lining at least one part of an internal wall of a conduit, the apparatus comprising at least one piece of material and adhesive, the piece of material comprising a spring steel sheet having a thickness in the range of 0.2 to 0.4 mm, and the piece of material being configured to be curled or rolled up to allow insertion into the conduit and being further configured to be allowed to at least partially uncurl or unroll inside the conduit once inserted therein in use, for securing the piece of material in place utilizing the adhesive, for applying the piece of material and obtaining a laminate on the part of the internal wall of the conduit.

16. An apparatus for lining at least one part of an internal wall of a conduit, the apparatus comprising at least one piece of material and adhesive, the piece of material comprising a spring steel sheet having a thickness in the range of 0.2 to 0.4 mm, and the piece of material being configured to be curled or rolled up to allow insertion into the conduit and being further configured to be allowed to at least partially uncurl or unroll inside the conduit once inserted therein in use, for securing the piece of material in place utilizing the adhesive, for applying the piece of material and obtaining a laminate on the part of the internal wall of the conduit, the material being configured so as to exert a resilient force component in response to being rolled or curled up, by which the piece of material may be urged to at least partially uncurl or unroll inside the conduit upon release.

17. The apparatus as claimed in claim 15, wherein an amount of the adhesive is applied to the piece of material with a greater thickness in one region of the piece of material than another, wherein the amount of the adhesive is applied so as to be disposed to make contact with the internal wall of the conduit, between an outside section of the piece of material and the wall in use.

18. The apparatus as claimed in claim 15, wherein the piece of material is provided with a woven structure in which an amount of the adhesive is embedded for reinforcing the laminate.

19. The apparatus as claimed in claim 15, wherein the adhesive is capable of sealing and securing the piece of material in place on the wall of the conduit.

20. The apparatus as claimed in claim 15, wherein the adhesive is configured to be activated to soften and set by a temperature in the conduit exceeding an activation temperature of the adhesive.

21. The apparatus as claimed in claim 15, wherein the piece of material is provided with a sealer for sealing between the piece of material and the wall of the conduit, wherein the adhesive in combination with the sealer provides for sealing and adhesion of the piece of material to the wall of the conduit to obtain the laminate.

22. The apparatus as claimed in claim 15, wherein the piece of material has a pronged edge for facilitating at least one of: rolling or curling up the lining; and
  partial unrolling or uncurling of the piece of material upon release.

23. The apparatus as claimed in claim 15 further comprising installation equipment including a tool comprising a mandrel for supporting the piece of material in the curled or rolled up configuration around the mandrel; and at least one retainer arranged retain the piece of material in the rolled or curled up configuration during insertion.

24. The apparatus as claimed in claim 23, wherein the retainer comprises at least one movable sleeve, and the tool further comprises at least one hydraulic actuator for moving the sleeve along the mandrel to release the piece of material.

25. The apparatus as claimed in claim 23, further comprising a heater device for at least one of producing heat for facilitating activation and curing of the adhesive for securing the piece of material in place inside the conduit.

26. A method of lining at least one part of an internal wall of a conduit, the method comprising:
  (a) providing at least one piece of material to be applied to the internal wall, and being curled or rolled up to allow insertion into the conduit, wherein the piece of material comprises a spring steel sheet having a thickness in the range of 0.2 to 0.4 mm;
  (b) providing a sealer;
  (c) inserting the rolled or curled up piece of material into the conduit; and
  (d) allowing the inserted piece of material to at least partially uncurl or unroll inside the conduit, utilizing the sealer between the piece of material and the internal wall of the conduit to seal therebetween, so as to apply the material and obtain a laminate on the part of the internal wall of the conduit.

* * * * *